(12) United States Patent
Burgard et al.

(10) Patent No.: US 6,503,461 B1
(45) Date of Patent: Jan. 7, 2003

(54) FEED INJECTOR WITH INTERNAL CONNECTIONS

(75) Inventors: Jeffrey E. Burgard, Lombard, IL (US); Gary A. Schulz, Arlington Heights, IL (US); Todd P. Mitchell, Bartlett, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 09/470,492

(22) Filed: Dec. 22, 1999

Related U.S. Application Data

(60) Provisional application No. 60/113,215, filed on Dec. 22, 1998.

(51) Int. Cl.$^7$ .............................. B01J 8/18; F27B 15/08
(52) U.S. Cl. ......................... 422/145; 422/139; 285/39
(58) Field of Search .............................. 239/434.5, 433, 239/530; 285/10, 95, 24, 108, 128.1, 39, 331, 363, 373, 421; 422/139–145

(56) References Cited

U.S. PATENT DOCUMENTS

| | | | |
|---|---|---|---|
| 3,071,540 A | 1/1963 | McMahon et al. | 208/163 |
| 3,654,140 A | 4/1972 | Griffel et al. | 208/113 |
| 3,687,487 A | 8/1972 | Lindholm | 285/55 |
| 4,159,132 A | 6/1979 | Hitz | 285/39 |
| 4,284,239 A * | 8/1981 | Ikeuchi | 208/113 |
| 4,434,049 A | 2/1984 | Dean et al. | 208/153 |
| 4,479,870 A | 10/1984 | Hammershaimb et al. | 208/164 |
| 4,717,467 A | 1/1988 | Haddad et al. | 208/113 |
| 4,832,825 A | 5/1989 | Mauleon et al. | 208/157 |
| 5,131,632 A | 7/1992 | Olson | 285/382 |
| 5,152,556 A | 10/1992 | Holland et al. | 285/353 |
| 5,173,175 A | 12/1992 | Steffens et al. | 208/157 |
| 5,265,917 A | 11/1993 | Hitz | 285/86 |
| 5,554,341 A | 9/1996 | Wells et al. | 422/145 |

* cited by examiner

Primary Examiner—Hien Tran
Assistant Examiner—Andrew G. Melick
(74) Attorney, Agent, or Firm—John G. Tolomei; James C. Paschall

(57) ABSTRACT

An injector of a type routinely used in an FCC unit for dispersing a feed into a fluidized stream of catalyst particles is given additional versatility and maintainability through the use of internal connections of a low profile type. The injector apparatus has at least one connection that is positioned inside a retaining sleeve and connects the discharge tip of the injector to the piping that extends outside the sleeve and delivers the feed to the injector. The connection can join materials that are not amenable to welding in a space that is too confined for a flange connection. The connection combines the ductile properties of the carbon steel or stainless steel for the feed piping with an abrasion resistant but brittle material that will extend the life of the nozzle tip. Such relatively brittle materials include ceramics. The injector will also routinely incorporate an internal sleeve for separating two different fluids that enter the injector independently and undergo mixing therein. An additional internal connection may be added to the internal tube to facilitate the addition of mixing devices at the end of the tube.

17 Claims, 4 Drawing Sheets

FEED INJECTOR WITH INTERNAL CONNECTIONS

CROSS-REFERENCE TO RELATED APPLICATION

This application claims priority from Provisional Application No. 60/113,215 filed Dec. 22, 1998, the contents of which are hereby incorporated by reference.

BACKGROUND OF THE INVENTION

1. Field of the Invention

This invention relates generally to the dispersing of liquids into fluidized solids. More specifically this invention relates to an apparatus for dispersing a hydrocarbon feed into a stream of fluidized catalyst particles and for joining conduit sections.

2. Description of the Prior Art

There are a number of continuous cyclical processes employing fluidized solid techniques in which fluids are dispersed into a suspension of fluidized particles. One of the more important processes of this nature is the fluid catalytic cracking (FCC) process for the conversion of relatively high-boiling hydrocarbons to lighter hydrocarbons boiling in the heating oil or gasoline (or lighter) range. The hydrocarbon feed is contacted in one or more reaction zones with the particulate cracking catalyst maintained in a fluidized state under conditions suitable for the conversion of hydrocarbons. Carbonaceous materials are deposited on the solids in the reaction zone and the solids are conveyed during the course of the cycle to another zone where carbon deposits are at least partially removed by combustion in an oxygen-containing medium. The solids from the latter zone are subsequently withdrawn and reintroduced in whole or in part to the reaction zone.

It has been found that the method of contacting the feedstock with the catalyst can dramatically affect the performance of the reaction zone. Modern FCC units use a pipe reactor in the form of a large, usually vertical, riser in which a gaseous medium upwardly transports the catalyst in a fluidized state. Ideally the feed as it enters the riser is instantaneously dispersed throughout a stream of catalyst that is moving up the riser. A complete and instantaneous dispersal of feed across the entire cross section of the riser is not possible, but good results have been obtained by injecting a highly atomized feed into a pre-accelerated stream of catalyst particles. Pre-acceleration is often accomplished in a riser conduit with the use of a lift gas to lift the catalyst particles before they contact the feed. After the catalyst is moving up the riser it is contacted with the feed by injecting the feed into a downstream section of the riser. A good example of the use of lift gas in an FCC riser can be found in U.S. Pat. No. 4,479,870.

Most often fluid is injected into the fluidized particles from multiple points with separate injectors. U.S. Pat. No. 4,717,467 shows one method for injecting an FCC feed into an FCC riser from a plurality of discharge points in a non-radial manner. U.S. Pat. Nos. 5,554,341, 5,173,175, 4,832,825, and 3,654,140 all show the use of radially directed feed injection nozzles to introduce feed into an FCC riser. The nozzles are arranged in a circumferential band about the riser and inject feed toward the center of the riser. The angled feed nozzles are typical of those used to inject feed or other fluids at an intermediate portion in the riser conduit.

The angled feed injectors present a number of problems for the operation of the risers. The nozzles typically extend away from the wall of the riser and into the flow path of the catalyst. Passing particles over the nozzles at high velocity can result in erosion. An obvious solution to the problem of nozzle protrusion would be to recess the nozzles completely into the wall of the riser and thereby remove them from the catalyst flow path. This solution is not satisfactory since the feed injector tips are specifically designed to provide a relatively uniform coverage of the hydrocarbon feed over the cross-section of the riser by expanding the pattern of feed injection as it exits from the nozzle. Completely recessing the tips of the injector nozzles within the wall of the riser disrupts the ability to obtain a spray pattern over the majority of the riser cross-sectional area.

In addition, a long recognized objective when injecting liquids into fluidized particles is the maximization of the hydrocarbon feed dispersal into the particulate suspension. Dividing the liquid into small droplets improves dispersion of the feed by increasing the interaction between the liquid and solids. Preferably, the droplet sizes become small enough to permit vaporization of the liquid before it contacts the solids. It is well known that agitation or shearing can atomize a liquid hydrocarbon feed into fine droplets which are then directed at the fluidized solid particles.

A variety of methods are known for shearing such liquid streams into fine droplets. U.S. Pat. No. 3,071,540 discloses a feed injection apparatus for an FCC unit wherein a high velocity stream of steam, converges around a stream of oil upstream of an orifice through which the mixture of steam and oil is discharged. U.S. Pat. No. 4,434,049 shows another device for injecting a fine dispersion of oil droplets into a fluidized catalyst stream wherein the oil is first discharged through an orifice onto an impact surface located within a mixing tube. The mixing tube delivers a cross flow of steam which simultaneously contacts the liquid. In both cases the combined flow of oil and steam exits the conduit through an orifice which atomizes the feed into a dispersion of fine droplets and directs the dispersion into a stream of flowing catalyst particles.

For the most part, the injectors rely on relatively high fluid velocities and pressure drops to achieve atomization of the oil into fine droplets. The use of discharge orifices, spray nozzles and other distribution and atomization equipment is common in such injectors. Providing this high pressure drop and fluid velocity creates a harsh environment that can quickly erode the components of a feed injector. Therefore, it is routinely necessary to replace or refurbish portions of the injector that are exposed to this harsh environment, particularly the tip of the injector that is often exposed to high velocity particulate material. In addition the position or type of nozzle on or within the injector can greatly influence the type of dispersion obtained and can vary with the feed composition or flow rate. Therefore, it would be advantageous to quickly change out the components in a feed injector that need adjustment for particular feeds or replacing due to damage.

In addition, the need to replace damaged components may be reduced by the use of more refractory materials. For example, ceramic materials could greatly improve the durability of many feed distributor components. However, the inability to incorporate such materials into the usual stainless or carbon steel pipe components of the injector by welding or by the use of standard connections makes their use extremely difficult and has eliminated the presence of such materials from large commercial designs.

The usual placement of injectors further complicates the fashioning of suitable connections for easy replacement of components and for joining materials with diverse properties. Positioning feed injectors around a riser requires a minimization of the opening for the feed injector and results in a confined space that leaves little room for the injector components. This limited space provides little extra clearance for supplying connections.

A known type of piping connection uses a series of machined grooves on the ends of pipes that are connected by bridging links that have complementary grooves for engaging the grooves on the pipe ends. A sleeve or other retaining means is used to hold the link members against the pipes and the cooperating grooves in engagement. Different forms of these types of connections can be seen in U.S. Pat. Nos. 5,152,556, 5,265,917, 5,131,632, 3,687,487, and 4,159,132 3,687,487 mentions that it may be used with ceramic materials.

It is an object of this invention to provide an apparatus that incorporates diverse materials of construction into a feed injection nozzle.

It is a further object of this invention to provide a method and apparatus that simplifies the replacement of feed injector components.

SUMMARY OF THE INVENTION

It has now been discovered that low profile pipe connections can significantly improve the operation of a feed injector by making possible the use of different materials that were not readily joined in the past and facilitating the replacement of critical feed injector components. The incorporation of the connectors gives the injector additional versatility and maintainability through the use of internal connections of a low profile type. The injector apparatus has at least one connection that is positioned inside a retaining sleeve and connects the discharge tip of the injector to the piping that extends outside the sleeve and delivers the feed to the injector. This connection can join a ceramic nozzle tip to the rest of the injector assembly. The connection permits the ductile properties of the carbon steel or stainless steel feed piping to extend from the external piping into a contacting vessel before providing an abrasion resistant but brittle material that will extend the life of the nozzle tip. The injector tip can be made from an abrasion resistant material such as a ceramic, a solid stellite, or hastealloy.

As a result, the mechanical connections within the feed injector may be used to interchange the feed distribution nozzle as well as internal components of the feed injector. Changing the length of the internal pipe nozzle can reposition the shearing surface with respect to the nozzle opening that produces atomization of the feed. Different nozzles can adjustably regulate the area at the exit point of the nozzle to maintain the desired shear action on the feed with different feed flow rates.

The injector will also routinely incorporate an internal sleeve for separating two different fluids that enter the injector independently and undergo mixing therein. An additional internal connection may be added to the internal tube to facilitate the use of specific structures that promote mixing at the end of the tube. A connection near the end of the tube may be particularly useful for placing specially designed spray nozzles and other cast or machined devices at the end of the tube. In certain cases the outside of the connector can serve a dual purpose as a connector and as a flow restrictor to provide a pressure drop at the end of the tube.

A variety of low profile connections have been referenced with the prior art and can provide suitable connections. A low profile connection usually provides a mechanical connection having an outer radius that is typically no greater than the inner diameter of the pipe sections that it connects. For example a flange connection for a nominal 3-inch diameter pipe has an approximate outside diameter of 8 inches, whereas a typical low profile connection for the same nominal diameter has an outer diameter of only 5 inches.

The connection serves two basic functions. It joins the two pipe components structurally for transmitting loads or providing support while it also provides sealing. The connection for this application can be kept relatively simple in most cases since the support of the nozzle tip and tube will not normally impose high structural loads. In addition, since connections join pipe sections with open ends, the required sealing pressure of the connection should remain relatively low. Where operating temperatures permit their use, the low profile connection may incorporate an O-ring or other resilient sealing material in the contact faces of the connectors.

Low profile connections that are most suitable for use in this invention will be joined by relatively rectangular ribs and grooves. The term "relatively rectangular" refers to the profile of the groove and mating rib cross-sections which will have essentially flat bottoms and top with sides that have only a slight angle. The side angle of the grooves and ribs are preferably minimized to provide no more than the slope needed for sealing pressure and to facilitate disassembly. Excessive slope angle can create unnecessary sealing pressure resulting in local areas of high shear and tensile stress at the bottom of the rib or groove. Such local areas of high tensile and shear stresses can lead to the failure of many cast and ceramic materials that are otherwise desirable for their abrasion properties. Preferably, the sidewalls will make an angle with respect to a transverse plane of the connection of no more than 10° and more preferably an angle of no more than 5°.

Feed injectors for use in this invention can be positioned in any vessel that contains particulate material for dispersion of the feed therein. The most common location anticipated for use of the feed injectors is in an FCC riser. Although the injectors may be used at any location in the riser, they will typically ring a transverse band somewhere in a middle section of the riser. The overall width of the band for retaining the injectors is preferably kept narrow.

Accordingly, in one embodiment, this invention is an injector apparatus for contacting catalyst with an at least partially liquid phase fluid in a contacting vessel. The apparatus includes a retaining sleeve fixed in the wall of the contacting vessel and an outer conduit adapted for insertion into the retaining sleeve and comprising a discharge portion and an inlet portion. The discharge portion defines a restricted opening by a discharge tip fixed at its distal end. An outside sleeve connection mechanically fixes the inlet portion to the retaining sleeve. The outside sleeve connection has a first part fixed about or near the outer end of the retaining sleeve. The first part is adapted to receive a second part of the outside sleeve connection that retains the inlet portion and is located outside of the vessel. An outer conduit connection mechanically joining the discharge portion to the inlet portion within the retaining sleeve. The outer connection includes a first half fixed to a proximate end of the discharge portion and defining a first plurality of transversely extended grooves on its outside surface and a second half fixed to a distal end of the inlet portion and defining a plurality of transversely extended grooves on its outside surface. A plurality of links hold the connection ends in sealed alignment by engagement of grooves on each end of the connection with ribs on each link. A locking member retains engagement of grooves until the connection is broken by removal of the locking member and the links.

In a more limited embodiment, this invention is an apparatus as previously described in the previous embodiment that also includes a tube having a discharge section and an inlet section. The inlet section has a proximate end fixed to the inlet portion and a distal end joined mechanically to a proximate end of the discharge section by a tube connection that is similar in construction and function to the outer connection. The tube and the inside of outer conduit define an annular flow path and the outside of the tube connection and inside of the outer conduit define a restricted passage along the annular flow path.

Additional objects, embodiments and details of this invention can be obtained from the following detailed description.

DETAILED DESCRIPTION OF THE INVENTION

This invention will be described in the context of an FCC process for the catalytic cracking of hydrocarbons by contact with a fluidized catalyst. The invention may be used in any process that requires a dispersion of a fluid into a fluidized particle stream as it passes through a conduit.

Figure 1:
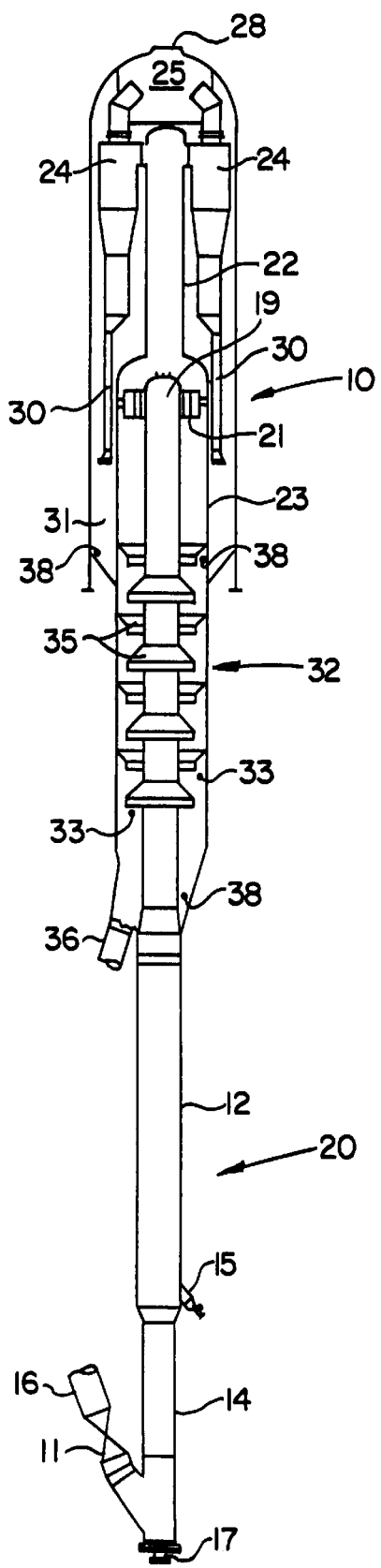
FIG. 1 is a sectional elevation of an FCC reactor and riser.

In a typical FCC process flow arrangement, finely divided regenerated catalyst leaves a regeneration zone and contacts a feedstock in a lower portion of a reactor riser zone. FIG. 1 shows a reactor 10 with a vertical riser 20 having an upper section 12 and a lower riser portion 14 into which a regenerator standpipe 16 transfers catalyst from a regenerator (not shown) at a rate regulated by a slide valve 11. A fluidization medium, typically steam, enters the riser through a nozzle 17 and a suitable distribution device (not shown). The fluidized catalyst flows upwardly through lower riser portion 14 at a relatively high density until it reaches a plurality of feed injection nozzles 15 (only one is shown) that inject a hydrocarbon feed across the flowing stream of catalyst particles. Upper riser section 12 has a larger internal diameter than lower section 14 to accommodate the volumetric expansion of the feed as it expands through contact with the hot catalyst. While the resulting mixture, which has a temperature of from about 200° C. to about 700° C., passes up through the remainder of the riser, conversion of the feed to lighter products occurs and coke is deposited on the catalyst. The effluent from the riser is discharged from the top 19 of riser 20 through a disengaging arm 21 that tangentially discharge the mixture of catalyst and gases into a disengaging chamber 23 to effect a separation of the gases from the catalyst. A transport conduit 22 carries the hydrocarbon vapors and entrained catalyst to one or more cyclone separators 24 that separate any spent catalyst from the hydrocarbon vapor stream. A collection chamber 25 gathers the separated hydrocarbon vapor streams from the cyclone for passage from an outlet nozzle 28 into a fractionation zone (not shown) known in the art as the main column.

The separated spent catalyst from cyclones 24 passes through dip legs 30 into the lower portion of collection space 31 and eventually passes into a stripping zone 32 across ports (not shown) defined by the bottom of disengaging chamber 23. Catalyst separated in disengaging chamber 23 passes directly into stripping zone 32. A stripping gas, usually steam, enters a lower portion of stripping zone 32 through an inlet 33 and may be distributed by one or more distributors (not shown). The stripping gas contacts the spent catalyst to purge adsorbed and interstitial hydrocarbons from the catalyst. A series of baffles 35 in the stripping zone improves contact between the catalyst and stripping gas. Additional gas for fluidization or stripping may be added through one or more inlets 38. The spent catalyst containing coke leaves the stripping zone through a reactor conduit 36 and passes into the regeneration zone where, in the presence of fresh regeneration gas and at a temperature of from about 620° C. to about 760° C., combustion of coke produces regenerated catalyst and flue gas containing carbon monoxide, carbon dioxide, water, nitrogen and perhaps a small quantity of oxygen. A stream of regenerated catalyst leaves the regeneration zone, and in repetition of the previously mentioned cycle, contacts the feedstock in the reaction zone.

In accordance with typical FCC practice, the feed exits injection nozzles 15 as a spray in a fan pattern. The nozzles are usually angled to tip the fan pattern in a downstream direction. The angle of the nozzles will typically be in a range of at least 20° and less than 70° with respect to a transverse plane passing through the nozzles. Droplet size within the spray and the velocity of the spray determines momentum of the feed as it travels across the open riser section. An expanding gas or gaseous component such as steam may be used as an energy source to break up the liquid. Another source of energy can consist of a high pressure drop for the gas and liquid mixture. The feed entering the feed injectors will usually have a temperature below its initial boiling point but a temperature above the boiling point of any steam or gaseous hydrocarbons that enter the distribution device along with the liquid. The gaseous material may equal up to about 0.2 wt % of the combined liquid and gaseous mixture entering the injectors. The gaseous material may be introduced into the injectors in any manner.

Figure 2:
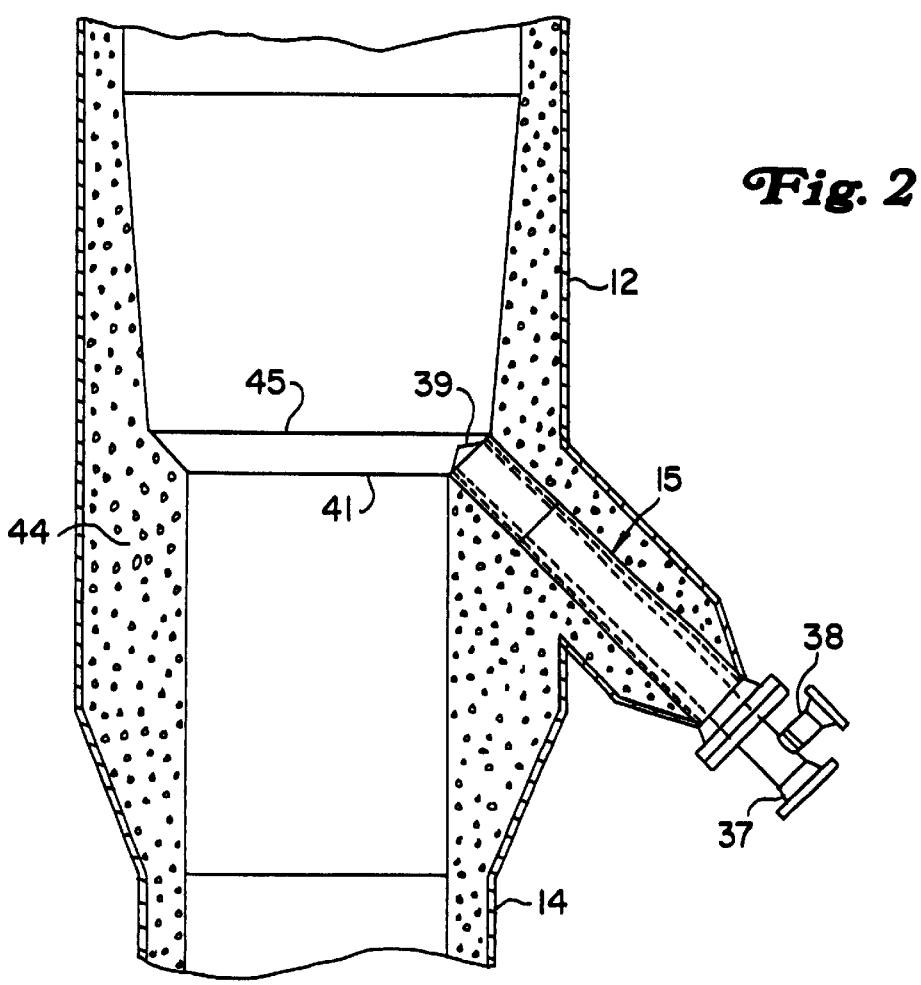
FIG. 2 is an enlarged section showing a mid-portion of the riser of FIG. 1.

Following mixing and ejection, contact of the feed with the hot catalyst creates a volumetric expansion from both the vaporization of liquid hydrocarbons and heating of the vapor as well as cracking of the hydrocarbons into lower molecular weight species. FIG. 2 more clearly shows the configuration of the feed injection nozzles 15 within the riser wall. Feed enters the back of injection nozzle 15 via a nozzle 37. Diluents, as previously described, can be injected through a nozzle 38 and mixed with the feed. A tip of the injector disperses the feed in an extended horizontal fan pattern through an appropriately designed outlet nozzle. A refractory lining material 44 insulates the outer wall of the riser and protects most of the injector from the flowing stream of catalyst. The injector nozzles all emerge into riser across a narrow band extending between lines 41 and 45.

Figure 3:
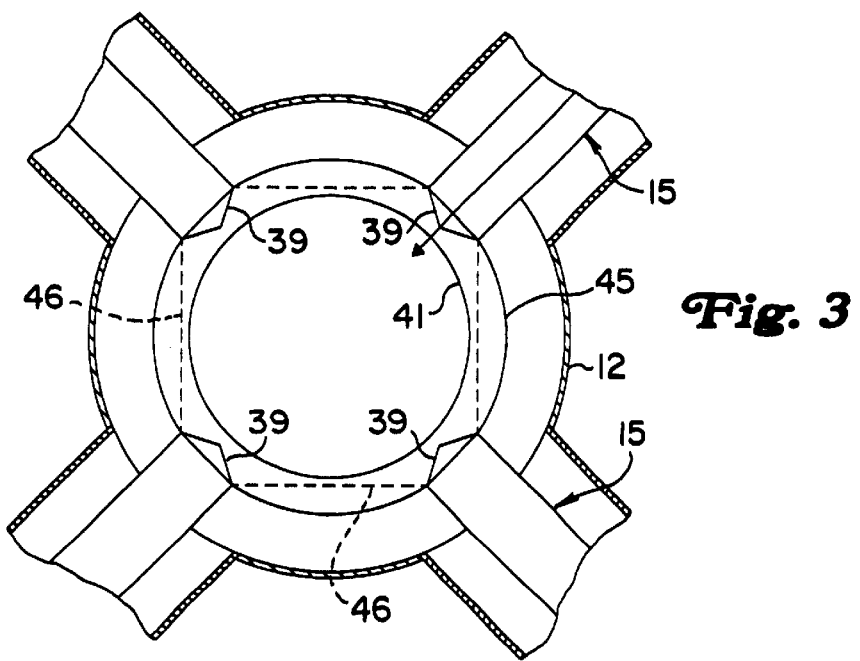
FIG. 3 is a plan view of a nozzle arrangement.

FIG. 3 shows the preferred arrangement wherein an injection zone includes at least 4 injector outlets. FIG. 3 also shows the extension of tips 39. The horizontal extent of the fan spray pattern for the feed injected by each nozzle 39 is represented by dashed lines 46.

Figure 4:
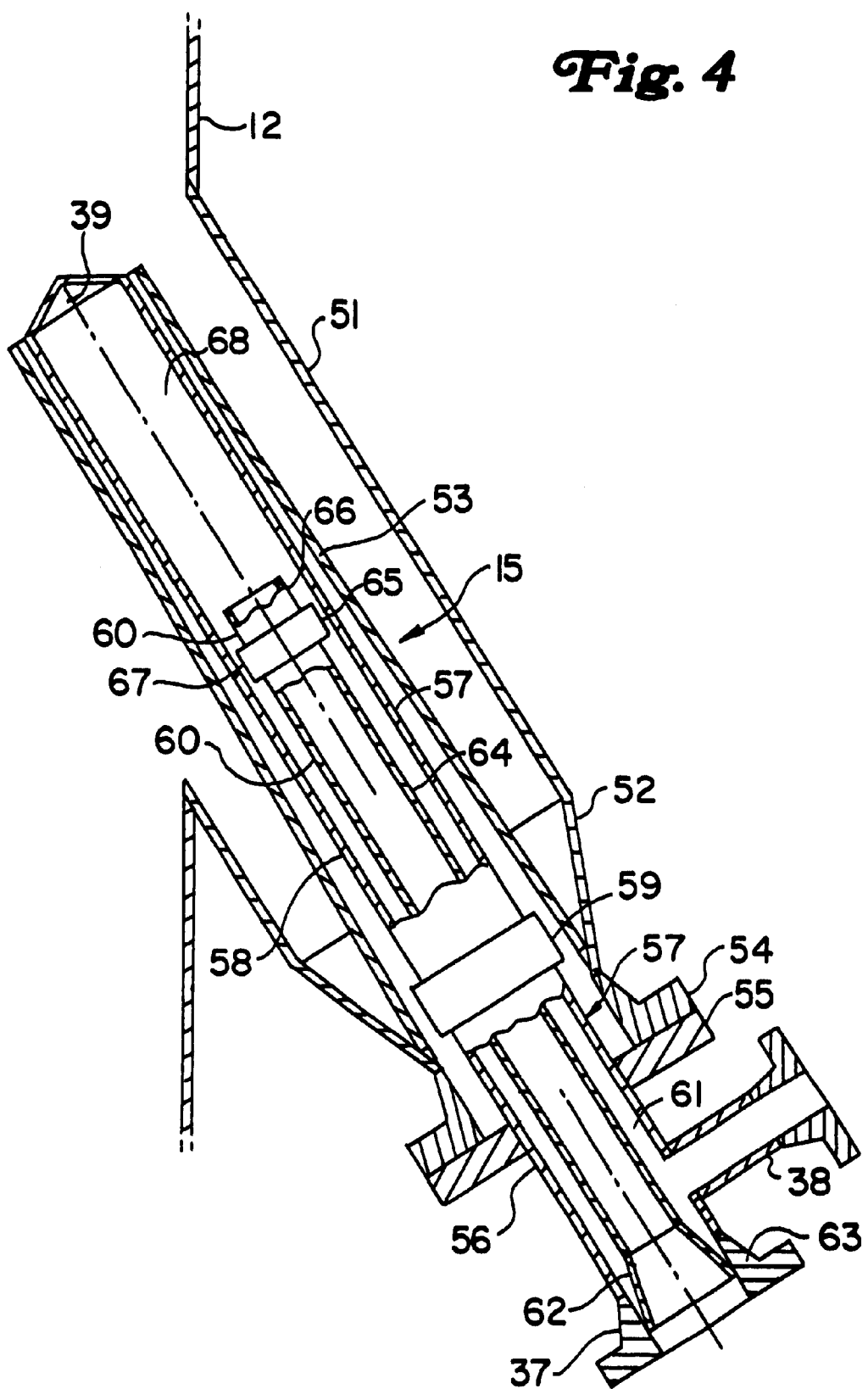
FIG. 4 is an enlarged sectional view of feed injector.

The components of feed injection nozzle 15 and its supporting structure to riser 12 is shown more clearly in FIG. 4. All refractory lining has been eliminated for clarification. A nozzle wall 51 extends at the angle of feed injector 15 from riser wall 12. A conical reducer 52 and a closure flange 54 supports a retaining sleeve 53 that extends inwardly into riser 12. A blind flange 55 closes flange 54 and has a central opening through which an inlet portion 56 extends. Inlet portion 56 is part of an outer conduit 57 having a discharge portion 58 with tip 39 attached to its distal end. A connector 59 joins the inlet portion 56 and discharge portion 58 of outer conduit 57. The inner diameter of flange 54 exceeds the outer diameter of connector 59 for its removal from sleeve 53. Sleeve 53 has a slight reduction in diameter from its attachment with reducer 52 to the tip 39 in order to reduce clearance between the outer conduit at tip 39 and the inside of sleeve 53. Inlet portion 56 retains nozzle 38 and together with a tube 60 defines an annular flow space 61. A flared portion 62, located at a proximate end of tube 60, joins tube 60 to a flange 63 and co-axially aligns the tube within outer conduit 57. An inlet section 64 of tube 60 extends from flared portion 62 into a connector 65 that joins a discharge section 66 of tube 60 to inlet section 64.

In operation, feed injector 15 receives steam and oil inlet streams that are mixed and discharged through tip 39. Steam flows in through nozzle 38, through annular space 61, and across a restricted diameter 67 before entering a mixing chamber 68. Oil in liquid phase enters tube 60 from nozzle 37 and is discharged through a spray nozzle retained by discharge section 66. Oil sprayed into chamber 68 mixes with steam to produce a dispersed mixture that undergoes further atomization as it is ejected from tip 39.

Components of feed injector nozzle 15 may be replaced by removing blind flange 55 and withdrawing the injector 15 from sleeve 53. Once removed connection 59 may be taken apart to replace discharge portion 58. With discharge portion 58 removed, connector 67 may be disassembled to remove discharge section 66 of tube 60. The discharge section 66 of tube 60 and the discharge portion 58 of outer conduit 57 may be replaced and injector reassembled by putting together connection 65 and then connection 59.

Figure 5:
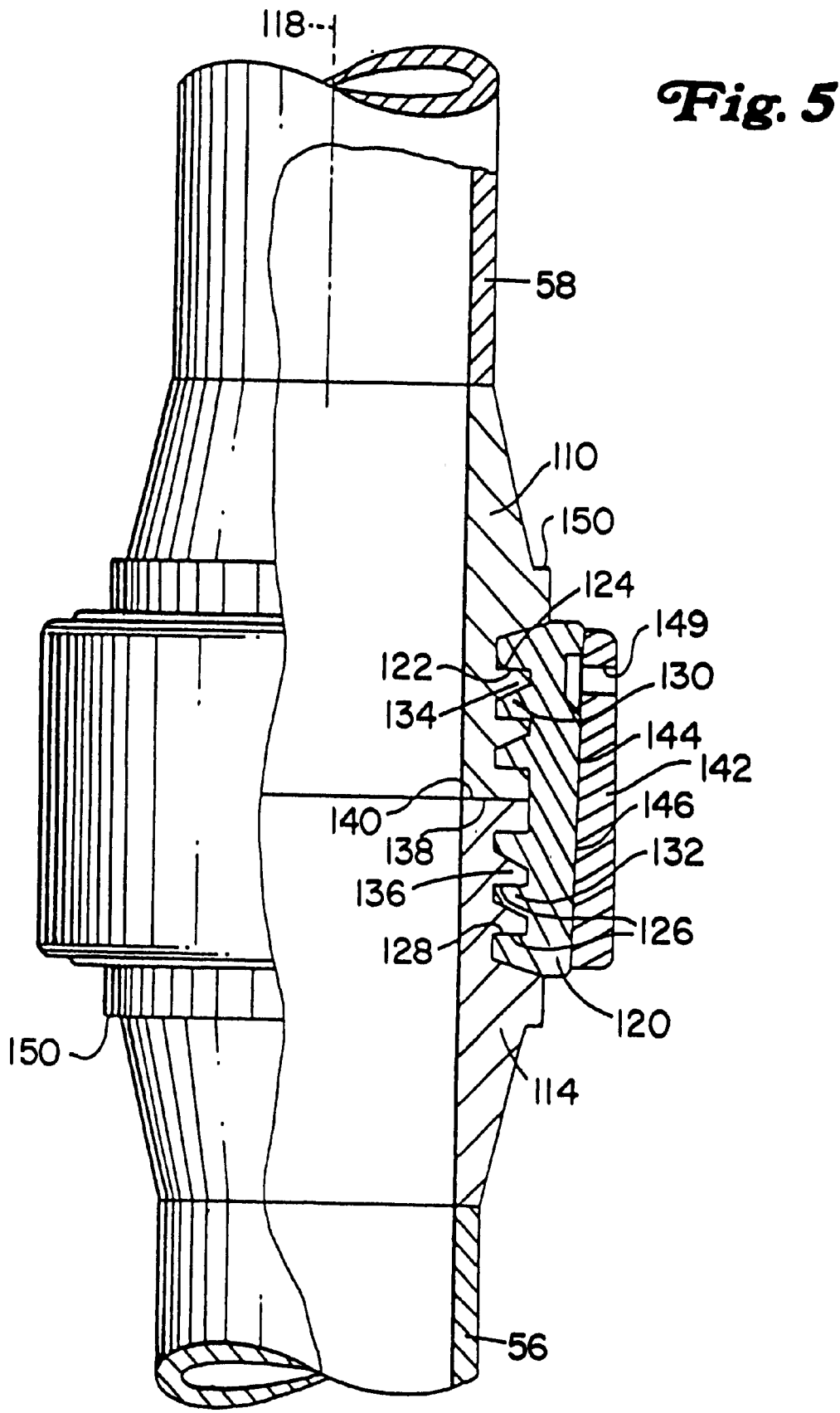
FIG. 5 is a partial section of the low profile connector.

FIG. 5 shows a low profile connection arrangement for use in the feed injection nozzle 15 as connection 59 or 65. When used for connector 59 the connection has a connection half 110 joined to discharge portion 58 and a connection half 114 joined to inlet portion 56. Connection halves 110 and 114 are located about a common axis 118. Each connection half 110, 114 also defines a shoulder 150 for engagement with a suitable device, such as a clamp, to provide an axial force and aligning movement to the connection halves during assembly.

At least two semi-cylindrical links 120 having contact surfaces 124 and 126 engage contact surfaces 122 and 128 on connector halves 110 and 114, respectively. A series of grooves defined by transversely extended ribs 130 and 132 on link 120 define the contact surfaces 126 and 124 respectively. Similarly transversely extended ribs 134 and 136 on connector halves 110 and 114 define contact surfaces 122 and 128. The grooves and ribs may be machined into the outer surface of the connection half or cast in place. Contact surfaces 122 and 124, and contact surfaces 126 and 128 may extend perpendicularly from the link or connector halves to provide a rectangular groove or may have a small taper to urge connector faces 138 and 140 toward teach other while still retaining an essentially rectangular shape for the grooves and ribs. The contact surface may extend all the way around pipe ends and over the entire transverse length of the link or may be formed as intermediate sections of contact surfaces over only a portion of the transverse length of the links and the connector halves. The use of a cooperating lip structure or other grooves on contact faces 138 and 140 can facilitate the alignment and assembly of the connection. Sealing of the contact faces may also be improved by the use of an O-ring in a suitable retaining groove.

Links 120 are held in place by an annular sleeve 142 that has a sloped surface 144 for engagement with a complementary sloped surface 146 on the outside of the links 120. A set screw or other similar attachment device (not shown) is received by a threaded hole 149 and may be used to keep sleeve 142 in place over links 120. The types of retaining devices are not limited to structures such as sleeve 142. Any suitable retaining structure or mechanism could be used such as a clamp arrangement.

What is claimed is:

1. An injector apparatus for contacting catalyst with an at least partially liquid phase fluid in a contacting vessel, said apparatus comprising:

a retaining sleeve fixed in the wall of the contacting vessel;

an outer conduit adapted for insertion into the retaining sleeve and comprising a discharge portion and an inlet portion;

a restricted opening defined by a discharge tip fixed at a distal end of the discharge portion;

a sleeve connection for mechanically fixing the inlet portion with respect to the retaining sleeve, said sleeve connection having a first part fixed with respect to an end of the retaining sleeve and adapted for connection to a second part of the sleeve connection that is fixed about a portion of the retaining sleeve located outside of the vessel; and an outer conduit connection for mechanically joining the discharge portion to the inlet portion within the retaining sleeve, said outer conduit connection including a first half fixed to a proximate end of the discharge portion and defining a first plurality of transversely extended grooves on an outside surface of said first half, a second half fixed to a distal end of the inlet portion and defining a second plurality of transversely extended grooves on an outside surface of said second half, a plurality of cooperating grooves defined transversely on a plurality of conduit links for holding the first half and second half in sealed alignment by engagement of the first and second plurality of grooves with the cooperating grooves on each conduit link and a locking member to retain engagement of first and second plurality of grooves with the cooperating grooves.

2. The apparatus of claim 1 wherein the outer conduit connection has an outer radius that does not exceed its inner diameter.

3. The apparatus of claim 1 wherein the inlet portion and the discharge portion comprise different materials.

4. The apparatus of claim 3 wherein the discharge portion including the first half of the outer conduit connection comprises a ceramic material.

5. The apparatus of claim 1 wherein the grooves and cooperating grooves have a relatively rectangular profile and the angle of the sidewalls of the cooperating grooves and grooves do not exceed 10° with respect to a plane transverse to the outer conduit connection.

6. The apparatus of claim 1 wherein a tube extends inside the outer conduit from the inlet portion into the discharge portion.

7. The apparatus of claim 6 wherein the tube has a discharge section and an inlet section, the inlet section has a proximate end fixed to said inlet portion and a distal end joined mechanically to a proximate end of the discharge section by a tube connection comprising a first member fixed to the proximate end of the discharge section and defining first rings of transversely extended grooves on an outside surface of said first member, a second member fixed to a distal end of the inlet section and defining second rings of transversely extended grooves on an outside surface of said second member, a plurality of cooperating ribs defined transversely on a plurality of tube links for holding the first and second members in sealed alignment by engagement of the first and second rings of grooves with the cooperating ribs on each tube link and a locking ring to retain engagement of the rings of grooves with the ribs.

8. The apparatus of claim 7 wherein the tube connection has an outer radius that does not exceed its inner diameter.

9. The apparatus of claim 7 wherein the outside of the tube and the inside of the outer conduit define an annular flow path and the outside of the tube connection and inside of said outer conduit define a restricted passage along the annular flow path.

10. An apparatus for mixing a fluid feed with a dispersing fluid to produce a dispersed feed and injecting the dispersed feed into a stream of fluidized catalyst particles flowing in a contacting conduit, said apparatus comprising:

a contacting conduit;

a retaining sleeve fixed in the wall of the contacting conduit;

an outer conduit adapted for insertion into the retaining sleeve and comprising a discharge portion and an inlet portion having an outside section that extends outside the contacting conduit and the retaining sleeve;

a restricted opening defined by a discharge tip fixed at a distal end of the discharge portion;

a sleeve connection for mechanically fixing the inlet portion with respect to the retaining sleeve, said sleeve connection having a first part fixed proximate to an end of the retaining sleeve and a second part located outside of the vessel;

a tube having a discharge section and an inlet section, the tube extending inside the outer conduit from the outside section of the inlet portion into the discharge portion to define an annular passage between the outer conduit and the tube with the proximate end of the inlet section fixed to the outside section;

a nozzle fixed to the outside section and in communication with the annular passage;

an outer conduit connection for mechanically joining the discharge portion to the inlet portion within the retaining sleeve, said outer conduit connection including a first half fixed to a proximate end of the discharge portion and defining a first plurality of transversely extended grooves on an outside surface of said first half, a second half fixed to a distal end of the inlet portion and defining a second plurality of transversely extended grooves on an outside surface of said second half, a plurality of cooperating ribs defined transversely on a plurality of conduit links for holding the first half and second half in sealed alignment by engagement of the first and second plurality of grooves with the ribs on each conduit link and a locking member to retain engagement of first and second plurality of grooves with the ribs on each conduit link; and a tube connection mechanically joining a proximate end of the discharge section and a distal end of the inlet section, the tube connection comprising a first member fixed to the proximate end of the discharge section and defining first rings of transversely extended grooves on an outside surface of said first member, a second member fixed to a distal end of the inlet section and defining second rings of transversely extended grooves on an outside surface of said second member, a plurality of cooperating grooves defined transversely on a plurality of tube links for holding the first and second members in sealed alignment by engagement of the first and second rings of grooves with the cooperating grooves on each tube link and a locking ring to retain engagement of the rings of grooves with the cooperating grooves of the tube links.

11. The apparatus of claim 10 wherein the outside of the tube connection and the inside of said outer conduit define a restricted passage along the annular flow path.

12. The apparatus of claim 10 wherein the outside radii of outer conduit connection and the tube connection do not exceed their respective inner diameters.

13. The apparatus of claim 10 wherein the inlet portion is made of a different material than the discharge portion.

14. The apparatus of claim 13 wherein the discharge portion including the first half comprises a ceramic material.

15. The apparatus of claim 10 wherein the contacting conduits has a plurality of retaining sleeves located in its mid portion within a band of its length.

16. The apparatus of claim 10 wherein said contacting conduit is a vertically oriented riser conduit.

17. The apparatus of claim 16 wherein the contacting conduit defines a particle inlet at an upstream end of the conduit for adding particles to the upstream end and a fluidizing gas inlet defined at an upstream end for injecting fluidizing medium and producing a dense particle bed.

* * * * *